United States Patent

Rubashkin et al.

Patent Number: 5,727,912
Date of Patent: Mar. 17, 1998

[54] CONTROLLER FOR CNC-OPERATED MACHINE TOOLS

[75] Inventors: Igor Rubashkin; Boris Fainstein; Igor Karasin; Eduard Tabachnik; Joel P. Warshawski, all of Jerusalem, Israel

[73] Assignee: Omat Ltd., Jerusalem, Israel

[21] Appl. No.: 464,633

[22] PCT Filed: Dec. 27, 1993

[86] PCT No.: PCT/US93/12344

§ 371 Date: Aug. 11, 1995

§ 102(e) Date: Aug. 11, 1995

[87] PCT Pub. No.: WO94/14569

PCT Pub. Date: Jul. 7, 1994

[30] Foreign Application Priority Data

Dec. 28, 1992 [IL] Israel ............................... 104250

[51] Int. Cl.$^6$ ............................................. B23C 9/00
[52] U.S. Cl. ........................... 409/132; 409/80; 409/84
[58] Field of Search ........................... 408/11, 10, 8; 364/474.12, 474.15, 474.28; 409/79, 80, 84, 186–188, 193, 194

[56] References Cited

U.S. PATENT DOCUMENTS

| | | |
|---|---|---|
| 3,267,344 | 8/1966 | McDaniel . |
| 3,581,830 | 6/1971 | Stoner ................................ 173/6 |
| 3,665,280 | 5/1972 | Payne et al. . |
| 3,665,493 | 5/1972 | Glowzewski et al. ............ 409/80 |
| 3,675,517 | 7/1972 | Tadayoshi ......................... 82/28 |
| 3,715,938 | 2/1973 | Ledergerber et al. ............ 82/1.11 |
| 3,906,681 | 9/1975 | Seidel .............................. 408/11 |
| 3,967,515 | 7/1976 | Nachtigal et al. ................ 409/80 |
| 4,157,231 | 6/1979 | Phillips ............................ 408/11 |
| 4,208,718 | 6/1980 | Chung . |
| 4,237,408 | 12/1980 | Frecka .......................... 364/474.12 |
| 4,330,832 | 5/1982 | Kohzai et al. ................. 364/474.15 |
| 4,451,187 | 5/1984 | Ishikawa et al. ............... 409/186 |
| 4,564,910 | 1/1986 | Smith et al. ................... 364/474.17 |
| 4,793,421 | 12/1988 | Jasinski . |
| 4,944,643 | 7/1990 | Lehrmkuhl . |
| 5,105,135 | 4/1992 | Nashiki et al. ................ 409/194 |
| 5,558,476 | 9/1996 | Uchida et al. ................. 408/11 |

FOREIGN PATENT DOCUMENTS

| | | |
|---|---|---|
| 1084455 | 9/1967 | United Kingdom . |
| 2056714 | 3/1981 | United Kingdom . |

OTHER PUBLICATIONS

WPI Abstract Accession No. 78-E0042A/21 & DE 2111960 (Fujitsu) 18.5.78.
WPI Abstract Accession No. 88-356229/50 & JP 63265582 (Toyota) 2.11.88.

Primary Examiner—A. L. Pitts
Assistant Examiner—Christopher Kirkman
Attorney, Agent, or Firm—Browdy and Neimark

[57] ABSTRACT

A controller for optimization of metal-working on CNC-operated machine tools, includes a first unit for monitoring the torque of the main drive of the machine tool to establish the actual, instantaneous cutting torque, a second unit for setting the rated cutting torque in the teaching mode in dependence on the main-drive torque as monitored, a third unit for calculating the feed rate required to maintain the cutting torque at a constant level and controlling the feed drive, and a fourth unit responsive to the monitored main-drive torque and providing feed rate limiting signals to the third unit for protecting the tool against breakage. The unit for calculating the feed rate is addressed by a compensator unit responsive to signals from a comparator unit comparing the torque as set with the actual, instantaneous torque as indicated by the first unit and to signals from an identifier unit calculating the instantaneous cross-sectional area of the cut in response to signals from both the first, main-drive torque monitoring unit and the feed-rate calculating unit. A method for optimization of metal-working on CNC-operated machine tools is also described.

10 Claims, 5 Drawing Sheets

CONTROLLER FOR CNC-OPERATED MACHINE TOOLS

The present invention relates to a controller and a method for optimization of metal-working on CNC-operated machine tools, especially on CNC-operated milling machines and machining centers.

While CNC-operated machine tools have existed for years, their efficiency and usefulness has been limited by their incapability to take into account many factors in the programming stage which influence production efficiency, including: number of workpieces in a run, operating cost, tool replacement time, tool cost, etc. In addition, the rigidly deterministic nature of CNC-operated machine tool programming is incapable of allowing for unforseeable changes in real-time cutting conditions such as depth and width of metal cutting, tool wear, non-uniformity of workpiece blank, etc.

A recent development in the field of CNC-operated machine tools provides for apparatus for controlling a machine tool as a function of torque load on a cutting tool when the torque load respectively exceeds or falls below a predetermined upper or lower critical torque load. For example, U.S. Pat. No. 4,237,408 describes critical torque loads including, inter alia, a catastrophic torque limit relative to the machine structure, a catastrophic torque limit relative to a particular tool and a minimum torque limit that should be present if a cutting tool is in contact with the workpiece.

It is one of the objects of the present invention to overcome the limitations and disadvantages of today's CNC-operated machine tools and to provide an optimizing controller for machine tools, in particular for CNC-operated milling machines and machining centers, which calculates the optimal cutting modes according to production efficiency criteria, and automatically provides adaptive feed and spindle speed control responding to real-time cutting conditions, maintains a constant and presettable spindle torque and/or tool life, ensures optimal machining operation, prevents tool breakage and indicates tool status.

According to the invention, this is achieved by providing a controller for optimization of metal-working on CNC-operated machine tools, having a main drive powering the tool spindle of said machine tools and feed drives powering the feed mechanism of said machine tools, said feed drives being controllable to produce a feed rate determined either by a predetermined setting of the cutting torque produced by said tool spindle, or by said controller overriding said setting in a teaching mode of said controller, comprising a first unit for monitoring the torque of the main drive of said machine tool to establish the actual, instantaneous cutting torque; a second unit for setting the rated cutting torque in said teaching mode in dependence on said main-drive torque as monitored; a third unit for calculating the feed rate required to maintain said cutting torque at a constant level and controlling the feed drive of said machine tool; a fourth unit responsive to said monitored main-drive torque and providing feed rate limiting signals to said third unit for protecting the tool against breakage, characterized in that said unit for calculating said feed rate is addressed by a compensator unit responsive, on the one hand, to signals from a comparator unit comparing said torque as set with the actual, instantaneous torque as indicated by said first unit and, on the other hand, to signals from an identifier unit calculating the instantaneous cross-sectional area of the cut in response to signals from both said first, main-drive torque monitoring unit and said feed-rate calculating unit, said compensator unit facilitating a high-precision stabilization of said torque.

The invention furthermore provides a method for optimization of metal-working on CNC-operated machine tools having a main drive powering the tool spindle of said machine tools and feed drives powering the feed mechanism of said machine tools, said feed drives being controllable to produce a feed rate determined by a predetermined setting of the cutting torque produced by said tool spindle, or by said controller overriding said setting in a teaching mode of said controller, comprising the steps of monitoring the torque of the main drive of said machine tool to establish the actual, instantaneous cutting torque; setting the rated cutting torque in said teaching mode in dependence on said main-drive torque as monitored; calculating, in a feed rate calculating unit, the feed rate required to maintain said cutting torque at a constant level and controlling the feed rate of said machine tool; providing feed rate limiting signals to a feed rate calculating unit for protecting the tool against breakage; comparing, in a comparator unit, said torque as set, with said actual, instantaneous torque; calculating, in an identifier unit, the instantaneous cross-sectional area of the cut in response to signals produced by both said main-drive torque monitoring unit and said feed rate calculating unit; feeding the signals from said two units to a compensator unit, and feeding the signals from said compensator unit to said feed rate calculating unit, thereby achieving high-precision stabilization of said cutting torque.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

The principal input parameters of the first and second embodiments of the controller according to the present invention are one or more of the main-drive parameters which are proportional to the cutting torque M. The principal output parameter is a signal determining the feed rate F as a function of M, the task fulfilled by the invention being to maintain this torque at a steady level determined in dependence on the properties of the specific milling cutter used. The required values can be found in appropriate tables.

Another concept of the present invention is the teaching mode in which, instead of the maximum rated cutting torque $M_o$, a maximum torque $M_o'$ is determined during the machining of one or several of the first identical workpieces. The teaching mode is particularly effective for large runs of identical workpieces.

Another important parameter used by the controller according to the invention is $\rho[\text{mm}^2]$, designating the cross-sectional area of the cut (for short, area of cut), which is the product of the cut width (b) and cut depth (h).

Figure 1:
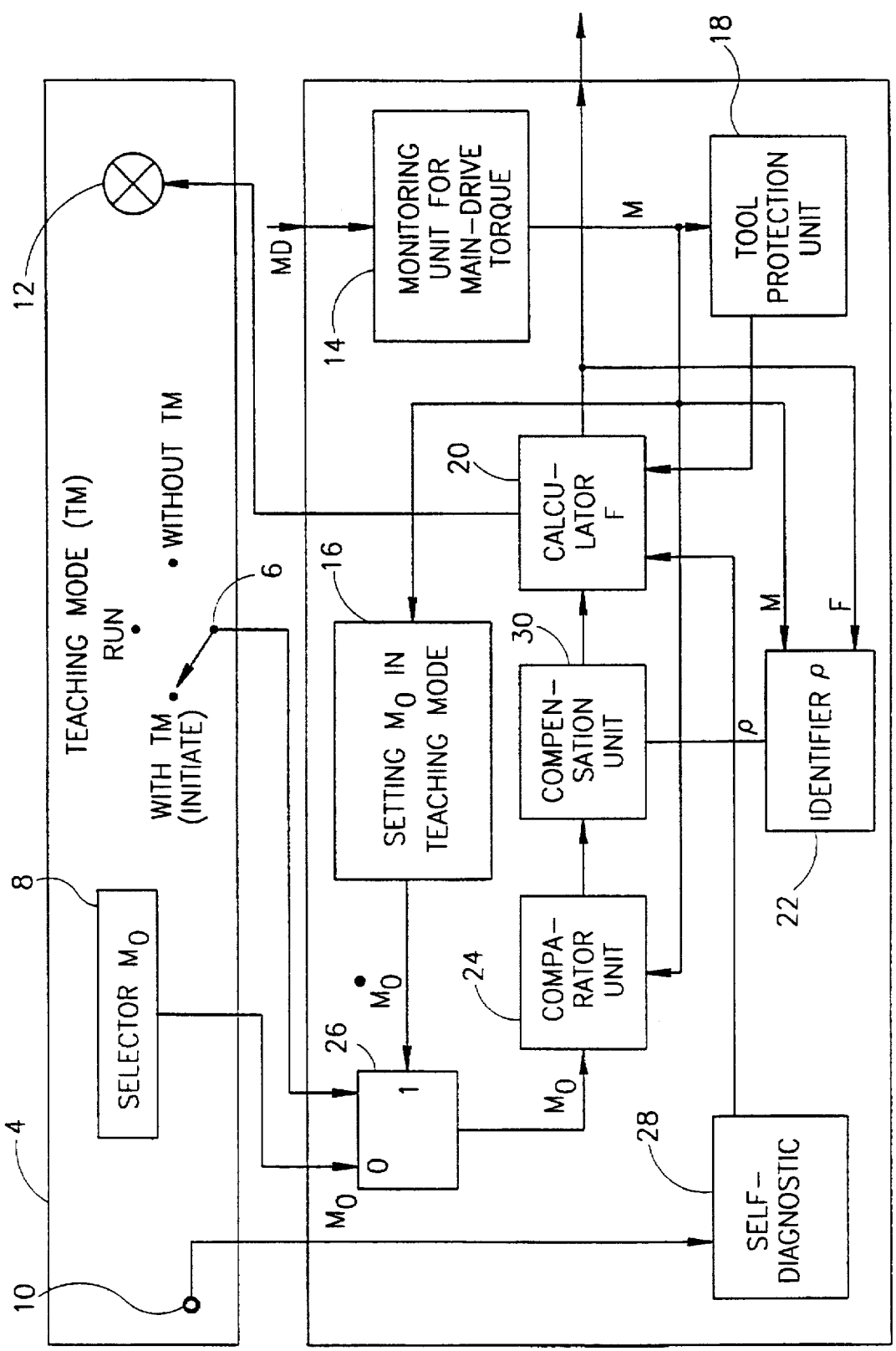
FIG. 1 is a block diagram of a first embodiment of the controller according to the invention.

Referring now to the drawings, there is seen in FIG. 1 a block diagram of a first embodiment of the controller according to the invention, comprising a housing 2 attachable to a CNC-operated milling machine and accommodating the various units of the controller, and a panel 4 which is accessible to the operator.

On the panel 4 is located a switch 6 for selecting: initiation of the Teaching Mode (TM) ("initiate"); "Run" for $M_o$ settings determined in the teaching mode, and operation with predetermined $M_o$ settings ("without TM"). In the latter, the value for $M_o$ is set on the selector 8. Other elements on panel 4 include a starting button 10 and a tool status indicator 12 which lights up, or provides, e.g., an acoustic warning, when the tool is worn beyond a certain limit.

There is seen a monitoring unit 14 in which the instantaneous main-drive cutting torque M (as applied by the milling cutter) is monitored.

The signal M from the monitoring unit 14 is fed to a number of other units of the controller:

a) the unit 16 for setting the rated cutting torque $M_o$ for application in the teaching mode;

b) a tool protection unit 18 which supplies feed rate limiting signals to a feed rate calculator 20;

c) a unit 22 for identifying the instantaneous value of $\rho$, also addressed by the signal from the feed rate calculator 20, and d) a comparator unit 24 which compares the set torque $M_o$ with the actual, instantaneous torque M.

According to the position of the mode switch 6, a logic element 26 provides the comparator unit 24 with the $M_o$ value as determined either by unit 16 or by the manual selector 8.

The controller also includes a self-diagnostic unit 28 interposed between the start button 10 on the panel 4 and the feed rate calculator 20. When the button 10 is pressed, the unit 28 performs a test of the entire system and, if the latter is found operational, provides an enabling signal to the feed rate calculator 20.

The heart of the controller is constituted by a compensator unit 30 in cooperation with the already-mentioned $\rho$-identifier unit 22.

The following is an explanation of the considerations underlying the compensation principle.

The feed rate is determined by the difference $\Delta M$ between the set value $M_o$ or $M_o'$ and the actual value M.

The metal-cutting process (as static process) can be represented by the expression:

$$M = AF^y \rho^\gamma$$

where:
$\rho$=the already-mentioned area of cut;
F=feed rate, and
A, y, $\gamma$=coefficients depending on tool type and metalworking conditions.

Seeing $\Delta M$ as the error of cutting torque stabilization, it can be defined as:

$$\Delta M = M_0 - M = M_0 \left( 1 - \frac{K_1 K_c A_\rho}{1 + K_1 K_c A_\rho} \right)$$

where:
$K_c$=CNC gain (static), and
$K_1$=current monitor gain.

However, in real-life machining, $\rho \ll 1/K_1 K_c A$, as a result of which $\Delta M \approx M_o$, or $M \approx 0$, making it impossible to achieve cutting torque stabilization with medium and small $\rho$-values.

In order to secure for M independence from changes of $\rho$, it is necessary to provide a compensator unit with variable gain $K_k$:

$$K_k = \frac{B}{\rho},$$

with B being a constant.

To calculate $K_k$ it is thus necessary to determine $\rho$ at every instant throughout the cutting process, which is done by unit 22 according to the assumption that $\rho$ is proportional to the ratio $\Delta M/F^\propto$, where $\propto$ is determined for each material to be cut.

Figure 2:
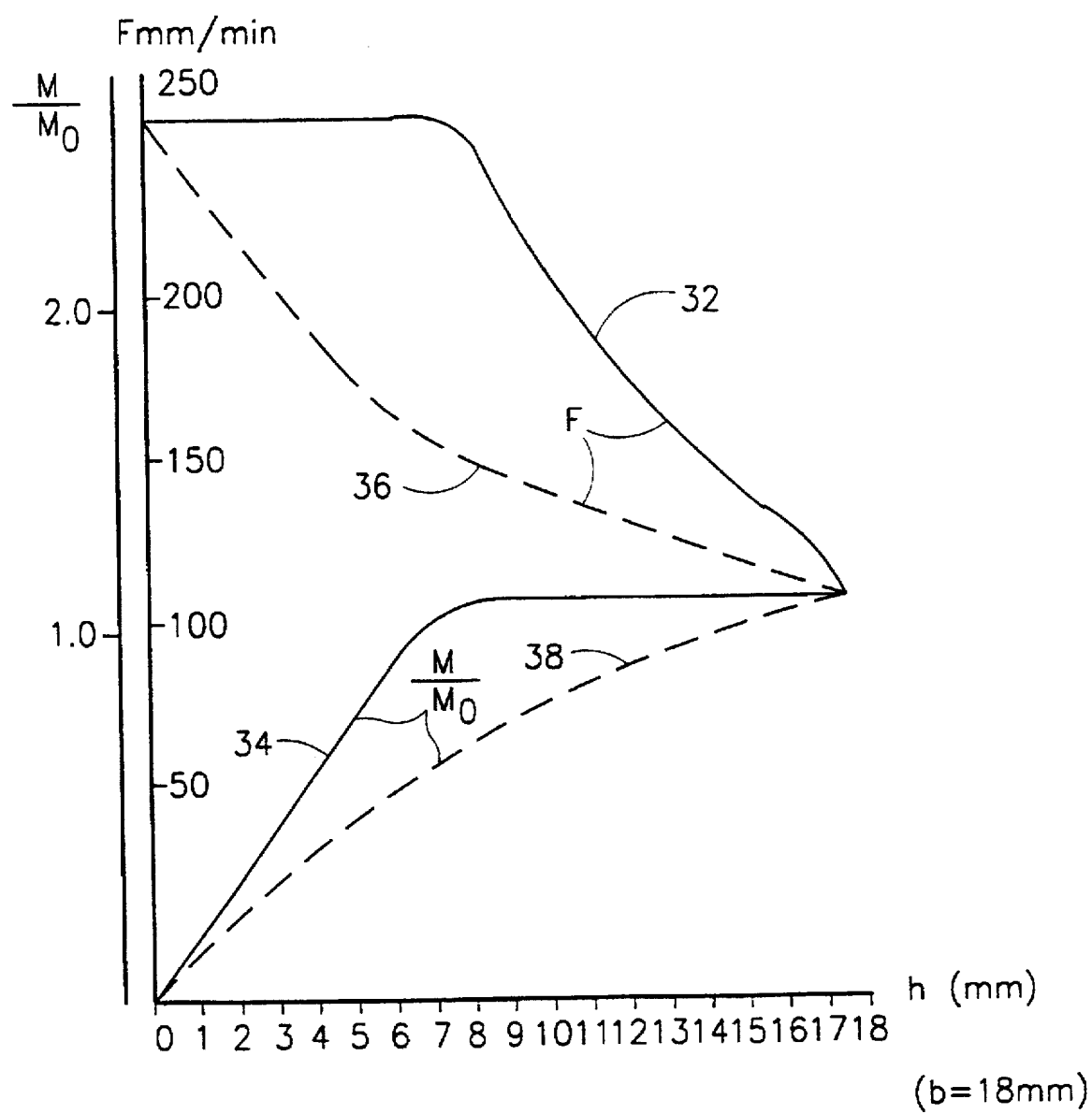
FIG. 2 is a diagram illustrating the effect, on the feed-rate values and the torque values, of the compensator unit.

The effect of the compensator unit is shown in FIG. 2, in which the solid curves 32 and 34 indicate the values of F and $M/M_o$ as functions of $\rho$ (specifically, of the cut height h) with compensation, and the dashed curves 36 and 38 indicate the same values F and $M/M_o$ without compensation.

The feed rate of the machine tool is obviously controlled by the output F of the feed rate calculator 20.

Figure 3:
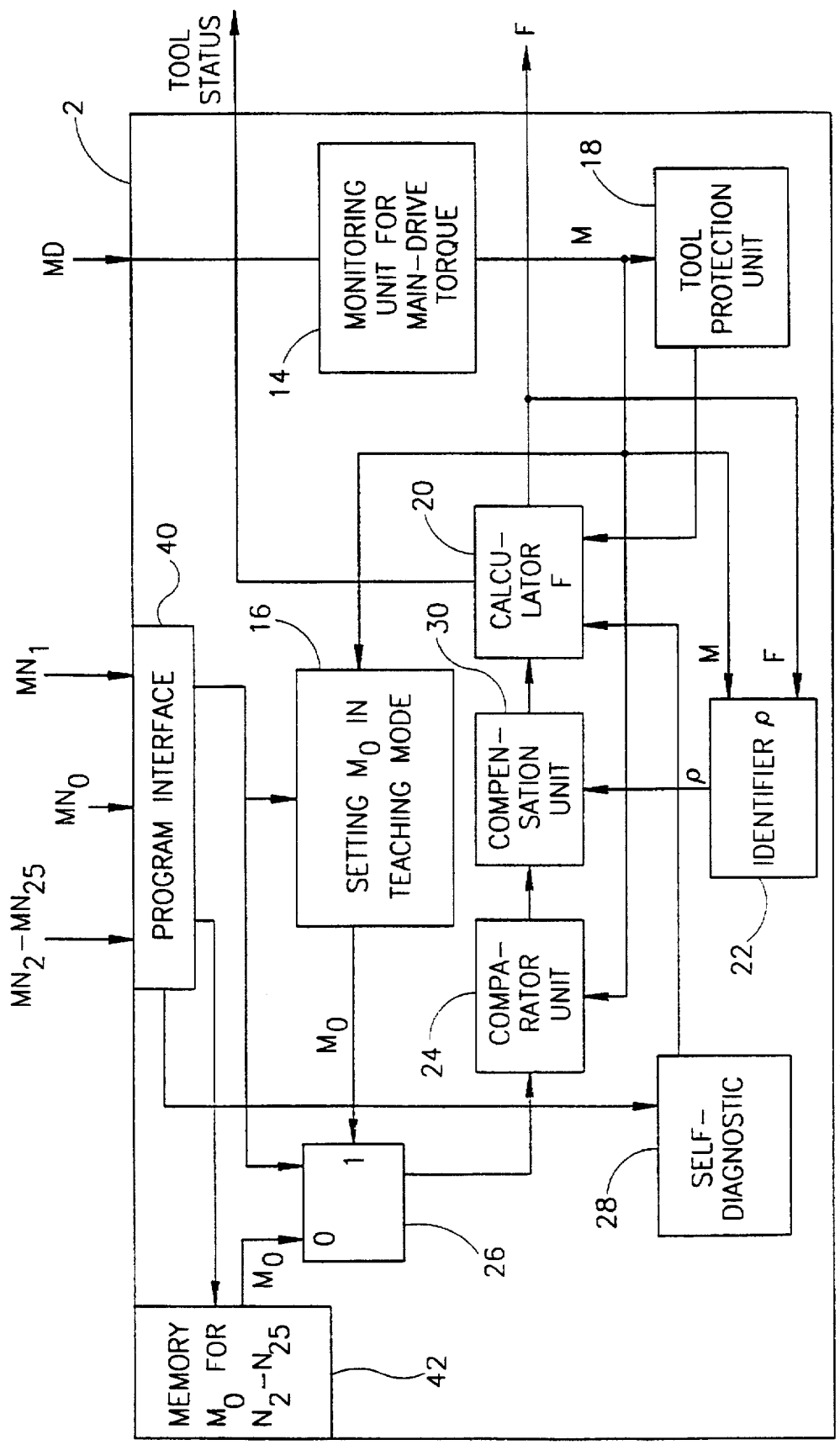
FIG. 3 is a block diagram of a second embodiment of the controller according to the invention.

FIG. 3 shows another embodiment of the controller according to the invention. This embodiment differs from the previous embodiment in that the controller is inaccessible to the operator, being addressed only by the CNC program. Added elements in this embodiment are a program interface 40 linking the controller to the CNC program and a memory unit 42 for the rated torque $M_o$ of a number of different tools N (as marked $MN_3-MN_{25}$) to be used in the machining process, with $MN_0$ and $MN_1$ signifying selection of the teaching mode and MN—without teaching mode. The rest of the unit is identical with the units of the previous embodiment and operate in the same manner.

Figure 4:
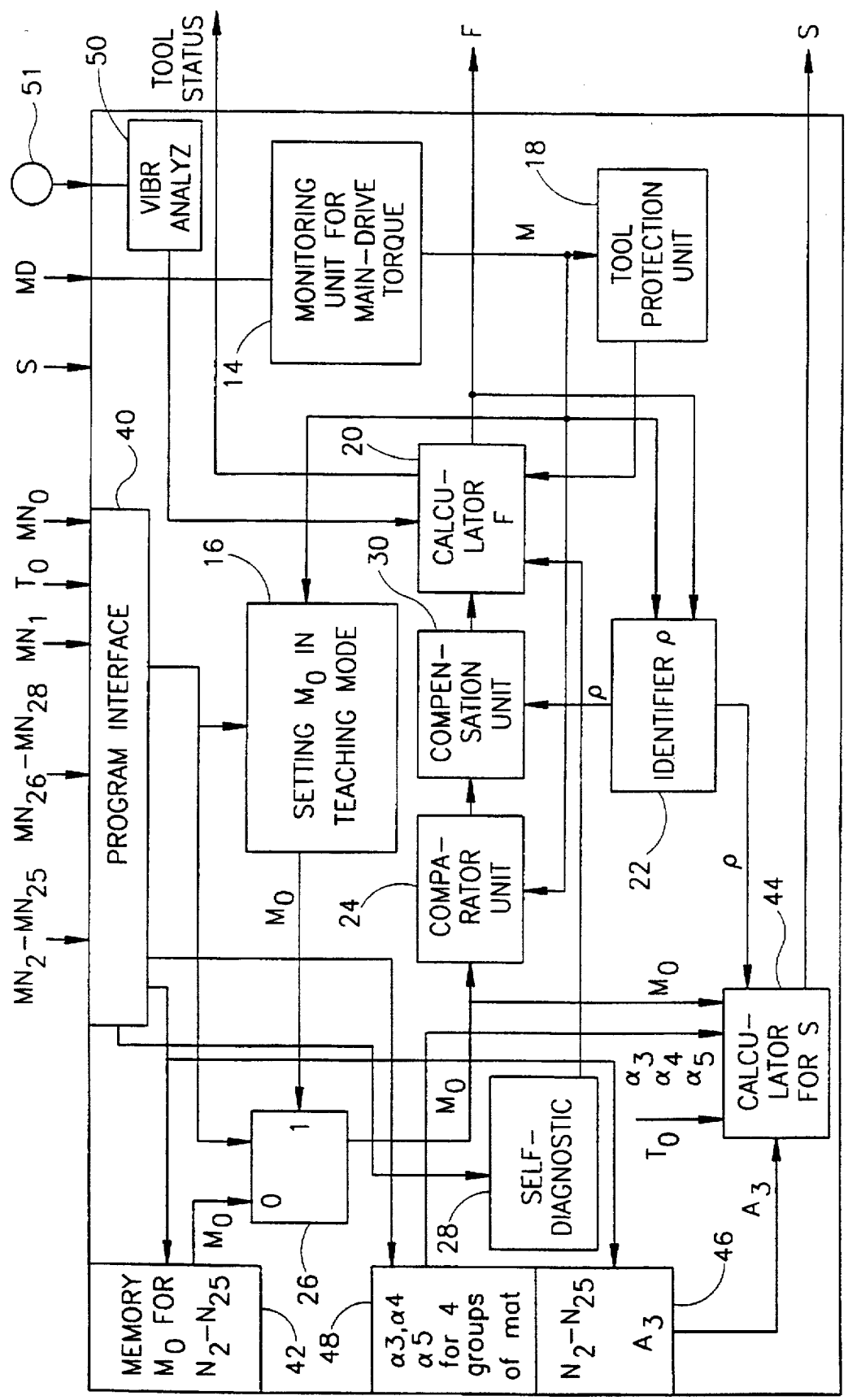
FIGS. 4 and 5 illustrate a third and a fourth embodiment, respectively, of the controller according to the invention.

The embodiment illustrated in the block diagram of FIG. 4 is intended for the optimization of machining operation on the basis of either one or the other of two criteria:

1) maximum metal removal per unit time (mm$^3$/min);

2) minimum cost of removal of unit volume of metal ($/min).

It is possible to select a compromise between these criteria.

The embodiment of FIG. 4 comprises all the units described in connection with FIGS. 1 and 3 (except for the panel 4 and its elements), as well as some additional units to be described further below.

While the first criterion is taken care of by the "F-loop" comprised of units 20, 22, 24 and 30 (FIGS. 1 and 3) and is conditional upon $M=M_o$, the second criterion requires the introduction of an additional unit, 44, which constitutes the operative part of an "S-loop", inasmuch as it is meant to control the speed IS) of the tool spindle. This unit consists of a calculator 44, which realizes the expression:

$$S = \frac{A_3}{F^{\propto_3}\rho^{\propto_4}T_o^{\propto_5}}$$

where:
$A_3$=coefficient dependent on the specific tool used;
$\propto_3, \propto_4, \propto_5$=coefficients depending on the material machined;
$\rho$=area of cut, supplied by the identifier unit 22,
F=feed rate, and
$T_o$=tool service life required for selected optimization criteria.

The first criterion is conditional upon the relationship:

$$T_o = \left( \frac{1}{m} - 1 \right) \tau.$$

The second criterion is conditional upon the relationship:

$$T_o = \left( \frac{1}{m} - 1 \right) \left( \tau + \frac{D}{B} \right)$$

where:
m=coefficient depending on the specific tool used and material machined;
τ=auxiliary or idle time (min);
D=cost of tool ($);
B=cost of machining per min ($/min).

The calculator 44 has five inputs:
a) coefficients $A_3$ for the tools N3–N25 (from memory 46 addressed by input $MN_3$–$MN_{25}$); p1 b) coefficients $\propto_3$, $\propto_4$, $\propto_5$ for four different groups of materials (from memory 48 addressed by input MN26–MN28);
c) signal F (from calculator unit 20);
d) area of cut ρ (from the identifier unit 22), and
e) projected tool service life $T_o$ (from unit for calculation of $T_o$).

Input $MN_o$ initiates the teaching mode and input $MN_1$ runs the teaching mode for all tool diameters.

The outputs of the controller of this embodiment are the same as with the previous embodiment (tool status and feed rate control signal F), with the addition of the speed control signal S.

Figure 5:
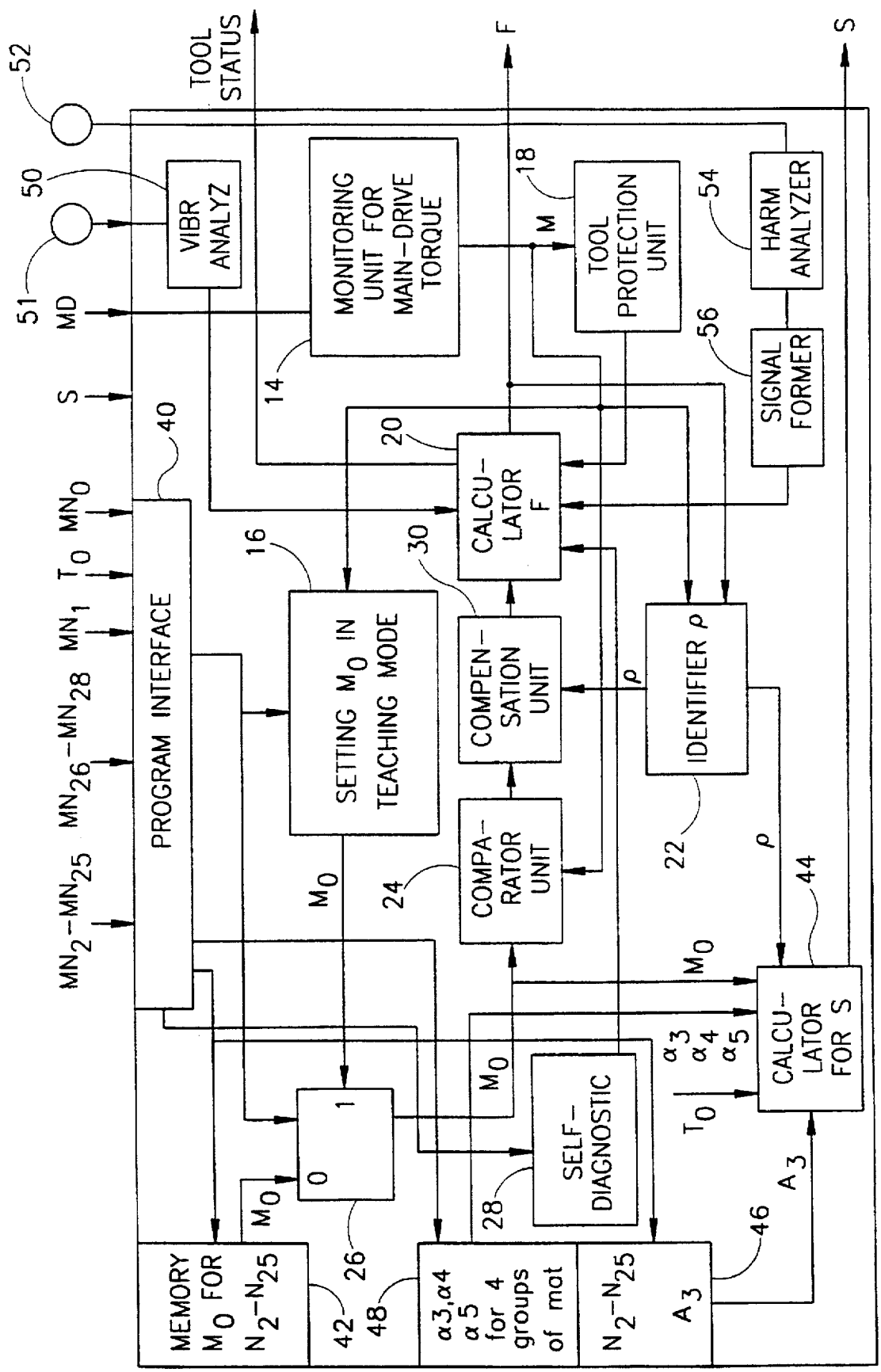

The embodiment represented in FIG. 5 has all the features described in the previous three embodiments, with the addition of two further features, namely, a circuit suppressing machine tool vibrations and chatter, and a circuit facilitating the finish machining, at high precision, of thin wall sections of workpieces.

The first of these features comprises a vibration analyzer 50 addressed by any suitable transducer 51 responding to vibrations and chatter of the machine. The output of the transducer 51 is analyzed by unit 50, which produces a signal fed to the feed rate calculator 20 which, in response, modifies the feed rate F to the degree required to suppress the vibrations, returning it to the original rate once this has been achieved.

The problem with thin sections is their elastic deformability under the cutting pressure of the milling cutter. Thus milling an aluminum wall of a thickness of, e.g., 2.5 mm and a length of 200 mm, taking a cut of a depth of 0.5 mm at a feed rate of 500 mm/min, a cutter speed of 1000 rpm and a tool diameter of 12 mm, will produce an error of 0.04 mm, while milling a section of a thickness of 10 mm at identical cut depth, feed rate, speed and tool will produce an error of only 0.005 mm. This difference is, of course, due to the "giving in", and subsequent spring-back, of the thin section, necessitating a reduction of the feed rate when the milling cutter arrives at such a thin section.

This not only complicates the CNC-program, but it is also difficult to determine at which point, after a heavy section, the thin section effectively begins. Also, a worn cutter will increase the deforming force which, with a new cutter, would be much smaller.

It is the task of the present embodiment to automatically reduce the feed rate the moment wall deformation is detected.

It was found that certain harmonics of the feed-drive current are reduced during the milling of thin walls, due to the change of frequency characteristics of the electrical-mechanical loop of which the thin section is a part. Thus, based on a dispersive analysis of feed-drive current signals, it is possible to form special signals indicating the effective beginning and ending of a thin section. These signals are used to reduce the feed rate during the machining of such thin sections, thus increasing the accuracy of the machining operation.

The added circuit of the embodiment of FIG. 5 comprises a suitable sensor 52 responsive to the feed-drive current, feeding an analyzer 54 for analyzing the harmonics of the feed-drive current, which analyzer addresses a signal transducer 56 producing signals that, fed to the feed rate calculator 20, modify the output signal of the latter, reducing the feed rate whenever the sensor 52 and analyzer 54 indicate the effective beginning of a thin section, and restoring the previous feed rate when the sensor 52 and analyzer 54 indicate the ending of this section. The embodiment of FIG. 3 is particularly suitable for CNC- operated machining centers using a pre-programmed sequence of different tools, and is more efficient than the previous embodiment, particularly due to the provision, as shown in FIG. 3, of the memory unit 42 which eliminates the need to reset the controller each time a tool is changed.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for adaptively controlling a feed rate F of a milling cutter relative to a workpiece, the milling cutter constituting part of a machine tool having a main drive, the system comprising:
    (a) a torque monitor for monitoring an actual main drive cutting torque M;
    (b) a torque comparator for calculating ΔM where $\Delta M = M_0 - M$ and $M_0$ is a predetermined reference main drive cutting torque established for the milling cutter and the workpiece material; and
    (c) a feed rate controller for determining the feed rate F as a function of ΔM;
    wherein
    said feed rate controller includes means to calculate an instantaneous cross-sectional area ρ of a cut of the workpiece being worked on by the milling cutter and determines the feed rate F as a function of ρ to substantially stabilized M such that ΔM→0.

2. The system according to claim 1 wherein said feed rate controller calculates said cross-sectional area ρ from the general relationship $M = AF^y \rho^\gamma$ where A,y and γ are coefficients dependent on the milling cutter and the workpiece material.

3. The system according to claim 1 further comprising a spindle speed controller for adaptively controlling the spindle speed of the milling cutter to obtain a desired predetermined tool service life $T_O$.

4. The system according to claim 1 further comprising a vibration suppression unit for minimizing vibrations of the milling cutter below a predetermined threshold.

5. The system according to claim 1 further comprising a feed drive current analyzer for reducing the feed rate F during stock removal along a thin walled workpiece section.

6. A method for adaptively controlling a feed rate F of a milling cutter relative to a workpiece, the milling cutter constituting part of a machine tool having a main drive, the method comprising the steps of:

(a) monitoring an actual main drive cutting torque M;

(b) calculating $\Delta M$ where $\Delta M = M_o - M$ and where $M_o$ is a predetermined reference main drive cutting torque established for the milling cutter and the workpiece material; and (c) determining the feed rate F as a function of $\Delta M$;

wherein step (c) includes calculating an instantaneous cross-sectional area $\rho$ of a cut of the workpiece being worked on by the milling cutter and determining the feed rate F as a function of $\rho$ to substantially stabilized M such that $\Delta M \rightarrow 0$.

7. A method according to claim 6 wherein the step of determining the feed rate includes calculating the cross-sectional area $\rho$ from the general relationship $M = AF^y \rho^\gamma$ where A, y and $\gamma$ are coefficients dependent on them milling cutter and the workpiece material.

8. The method according to claim 6 further comprising the step of:

(d) adaptively controlling the spindle speed of the milling cutter to obtain a desired predetermined tool service life $T_o$.

9. The method according to claim 6 and further comprising the steps of:

(e) monitoring the vibrations of the milling cutter;

(f) comparing said vibrations to a predetermined threshold;

(g) modifying the feed rate to substantially suppress said vibrations below the predetermined threshold; and (h) restoring the feed rate to its original value for as long as said vibrations are below the predetermined threshold.

10. The method according to claim 6 further comprising the steps of:

(i) monitoring the feed drive current of the milling cutter;

(j) analyzing the feed drive current for reduced harmonic levels indicative of stock removal along a thin walled workpiece section; and (k) reducing the feed rate on the detection of said reduced harmonic levels.

* * * * *